United States Patent [19]
Miller

[11] Patent Number: 5,810,898
[45] Date of Patent: Sep. 22, 1998

[54] NESTABLE PLEATED FILTER

[75] Inventor: William D. Miller, Hideaway Hills, Ohio

[73] Assignee: Superior Fibers, Inc., Bremen, Ohio

[21] Appl. No.: 861,616

[22] Filed: May 22, 1997

[51] Int. Cl.$^6$ ................................................ B01D 46/10
[52] U.S. Cl. ............................... 55/501; 55/511; 55/521; 55/DIG. 31
[58] Field of Search .............................. 55/501, 511, 521, 55/DIG. 31

[56] References Cited

U.S. PATENT DOCUMENTS

| | | |
|---|---|---|
| 3,154,393 | 10/1964 | Klein et al. . |
| 3,243,943 | 4/1966 | Getzin . |
| 3,853,529 | 12/1974 | Boothe et al. . |
| 3,970,440 | 7/1976 | Copenhefer et al. . |
| 4,004,899 | 1/1977 | Giacovas . |
| 4,105,423 | 8/1978 | Latakas et al. . |
| 4,277,267 | 7/1981 | Posner . |
| 4,420,315 | 12/1983 | Kershaw . |
| 4,464,187 | 8/1984 | Kershaw . |
| 4,647,373 | 3/1987 | Tokar et al. ................................ 55/521 |
| 4,842,739 | 6/1989 | Tang ........................................... 55/521 |
| 5,232,480 | 8/1993 | Licatovich . |
| 5,320,655 | 6/1994 | Ernst ................................... 55/DIG. 31 |
| 5,505,852 | 4/1996 | Van Rossen ............................... 55/521 |
| 5,589,067 | 12/1996 | Rice .......................................... 55/521 |

*Primary Examiner*—Jay H. Woo
*Assistant Examiner*—Minh-Chau T. Pham
*Attorney, Agent, or Firm*—Frank H. Foster; Kremblas, Foster, Millard & Pollick

[57] ABSTRACT

A nestable filter having a central panel with a frame attached around the peripheral edges of the central panel. The central panel has elongated corrugations which extend longitudinally from one side to the opposite side. The frame is made up of frame members which have a generally V-shaped cross-section, the inner leg of which attaches to the edges of the corrugated central panel. Corrugated voids are formed on the inner wall of at least two of the frame members, aligned with the channels formed by the corrugations, permitting the filter to nest within a similarly constructed filter.

16 Claims, 6 Drawing Sheets

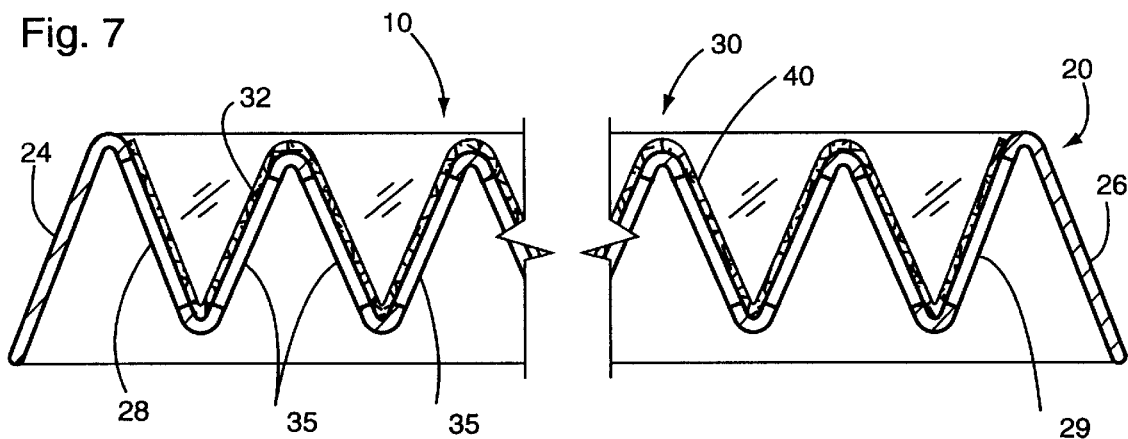
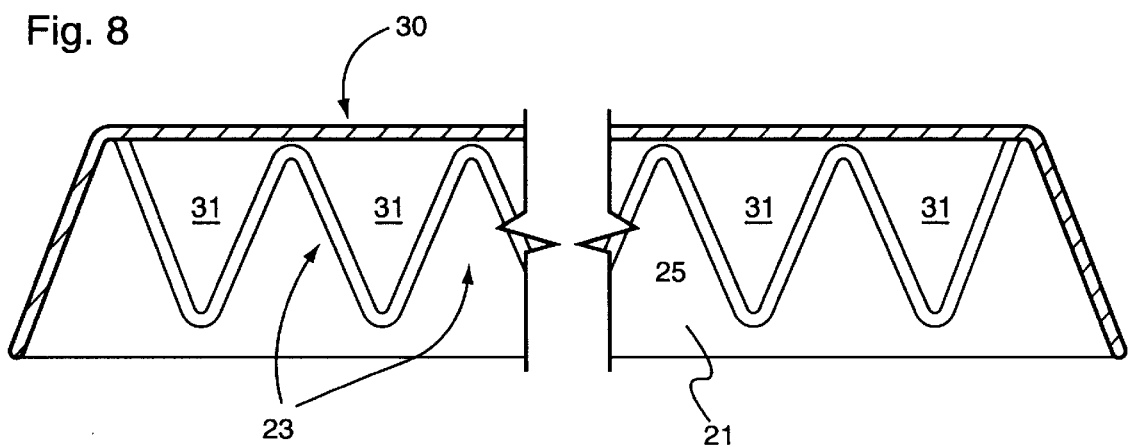

NESTABLE PLEATED FILTER

TECHNICAL FIELD

This invention relates to filters for removing particles from a fluid, such as air, flowing through a confined path. The invention relates more specifically to a nestable filter having a pleated central region.

BACKGROUND ART

Filters for filtering particles from a fluid flow path, such as a furnace duct, are generally planar and rectangular. The conventional filter consists of an outer frame providing structural rigidity to a flexible, foraminous filter medium extending between the frame members. A backing structure supporting the rear (down-flow) side of the filter medium is commonly used to prevent the force of the flowing air directed against the filter medium from separating the filter medium from the frame, and from physically distorting the filter and causing loss of its peripheral seal. This backing is normally a screen or other perforated, strong, planar structure.

U.S. Pat. No. 3,154,393 to Klein et al., U.S. Pat. No. 4,277,267 to Posner, U.S. Pat. Nos. 4,420,315 and 4,464,187 to Kershaw, and U.S. Pat. No. 5,232,480 to Licatovich all show filters having the conventional filter structure described above.

It has been noticed that nestability of one filter with another is advantageous, since this enables transportation and storage of a greater number of filters within the same package volume, which reduces costs. The Kershaw patents, U.S. Pat. No. 3,970,440 to Copenhefer et al., and U.S. Pat. No. 4,105,423 to Latakas et al. provide some degree of nestability in a conventional filter configuration.

Many inventors, rather than making their filters nestable, have developed a pleated (also called corrugated) filter which provides a significant increase in the filter medium surface area. This increased surface area results in improved filtration. The pleated filter medium is attached at the edges to frame members and backed by a support. U.S. Pat. No. 3,243,943 to Getzin, U.S. Pat. No. 3,853,529 to Boothe et al. and U.S. Pat. No. 4,004,899 to Giacovas all show pleated filter media. However, none of the frames of these pleated filters allow nesting with similarly constructed filters. The frames around the pleated filter media are C-shaped in cross-section, the side leg of which abuts against the edges of the pleated filter medium, and the upper and lower legs of which abut against the upper and lower surfaces of the pleated filter medium.

The need exists, therefore, for a filter which has the advantages of the pleated filter medium in combination with a nestable configuration.

BRIEF DISCLOSURE OF INVENTION

The filter of the present invention comprises a corrugated central panel having elongated corrugations arranged in a plane. The corrugations extend longitudinally from a first peripheral edge of the central panel to a second peripheral edge of the central panel. The central panel has a first face and an oppositely directed second face. The filter further comprises at least two frame members. Each frame member is mounted to one of the peripheral edges of the central panel, and comprises an elongated wall extending at an obtuse angle from the plane of the central panel to permit nesting. Each frame member has corrugated voids extending in from a longitudinally extending edge of the elongated wall to permit nesting receipt of the corrugations of a similarly constructed filter.

In one embodiment of the invention, the corrugated central panel and frame members are made of a rigid filtration material. In another embodiment of the invention, the central panel comprises a corrugated support having a plurality of apertures formed therein, and a filter medium mounted to a face of the support. The corrugated support forms a unitary, rigid backing for the filter medium.

BRIEF DESCRIPTION OF DRAWINGS

FIG. 7 is a side view in section of the embodiment of FIG. 4.

FIG. 8 is a side view in section of the embodiment of FIG. 4.

Figure 1:
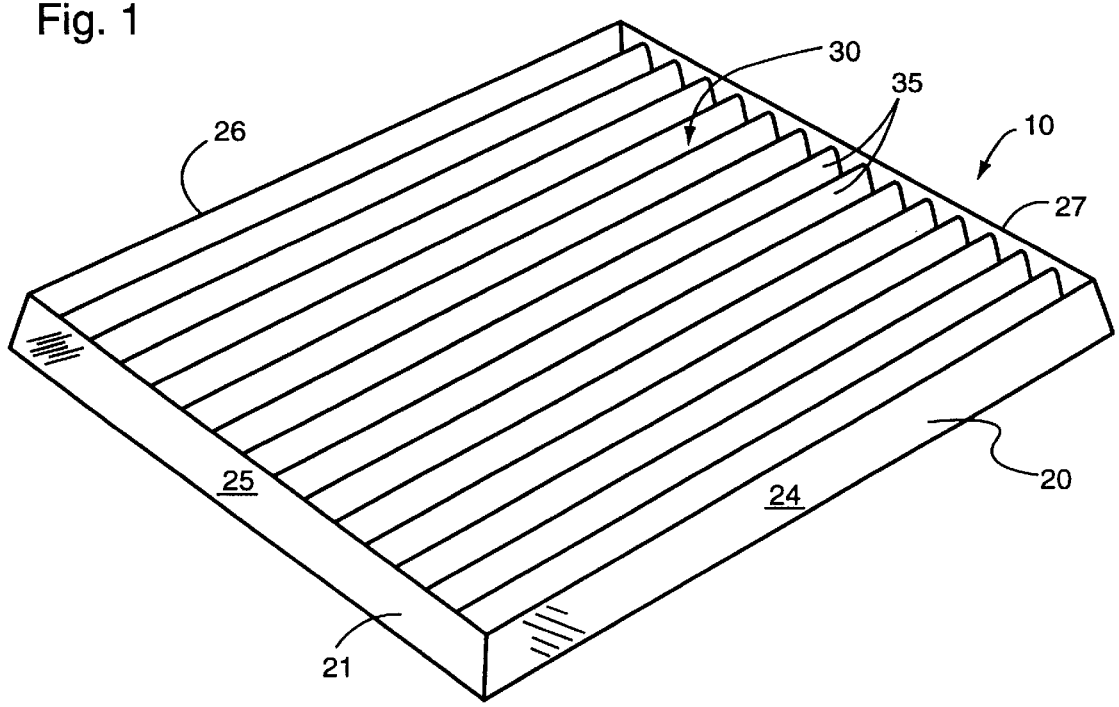
FIG. 1 is a view in perspective illustrating the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION

The preferred filter 10 is shown in FIG. 1. An outer frame 20 surrounds and attaches to a corrugated central panel 30. The frame 20 is made up of the frame members 24, 25, 26 and 27. In the broken-away view of FIG. 2, the frame member 25 is shown to have an outer wall 21 and an inner wall 22 angled relative to one another to form an inverted V when viewed in section (as in FIG. 5). Each of the frame members 24–27 has this V-shaped configuration.

The central panel 30 is made up of a plurality of elongated, alternatingly oriented panels 35 joined at an angle with the long edges of adjacent panels 35 to form pleats or corrugations. For the present application, the terms "pleated" and "corrugated" and their derivatives are equivalent and are used interchangeably. The corrugated central panel 30 has ridges at the peaks of the corrugations and channels between the ridges. The ridges of the upwardly directed face of the central panel 30 correspond with the channels of the downwardly directed face, and vice versa. The four peripheral edges of the corrugated panel 30 attach to the inner walls of the frame members 25–27, preferably attaching along a continuous, unbroken joint around the entire periphery of the central panel 30.

Figure 2:
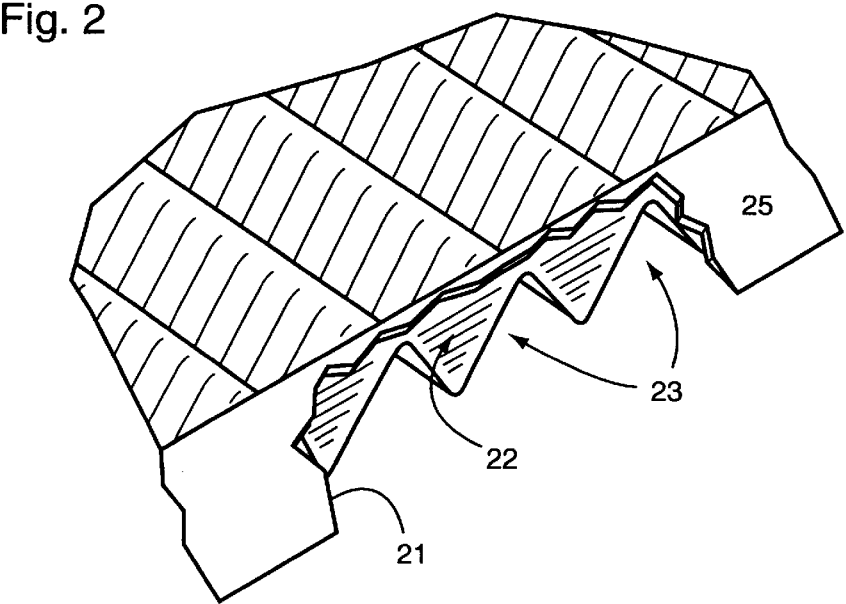
FIG. 2 is a view in perspective of the filter of FIG. 1, with a portion of the frame broken away.

Referring to FIG. 2, the inner wall 22 of the frame member 25 has corrugated voids 23 extending upwardly from its lower edge. The corrugated voids 23 are formed in the inner wall 22 to align with the channels in the underside of the corrugated panel 30. Similar corrugated voids are also formed on the inner wall 31 of the frame member 27. These similar voids (not shown in FIG. 2) are also aligned with the channels on the central panel's 30 underside. A corrugated, sawtooth-shaped joint is formed between the opposite, longitudinal ends of the corrugations of the central panel 30 and the lower edges of the inner walls 22 and 31.

The approximately 30 degree angle formed between the inner walls and outer walls of the frame members 24–27 to form a V-shape, or alternatively a U-shape, permits the frame 20 to nestably receive a similarly shaped frame of another filter. For nesting to be possible in general, each protruding part of one body must nest within the corresponding part of another body. With the present invention, the angle between the walls of the frame 20 permits this nesting relationship between the frames of filters embodying the present invention. Furthermore, by forming the corrugated voids 23 at opposite longitudinal ends of the corrugations, the channels on the bottom of the central panel 30 effectively extend beyond the inner walls 22 and 31. Therefore, ridges in the top of a similar filter can nest in these channels. The corrugated voids formed in the inner walls 22 and 31 of the frame members 25 and 27, respectively, permit the upper surface of the corrugations of a similarly constructed filter to nestably seat against, or at least within, the corrugated underside of the central panel 30 and the corrugated lower edges of the inner walls 22 and 31. When combined with the nestability of the frame 20, the entire filter 10 can nest with other similarly shaped filters.

Figure 3:
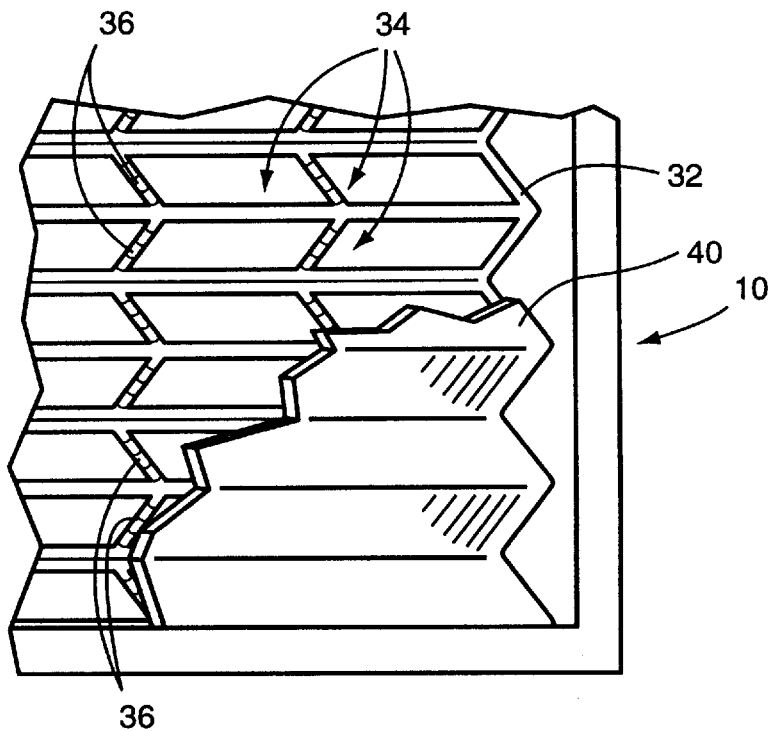
FIG. 3 is a top view in section illustrating the preferred apertures formed in the corrugated central panel.

In FIG. 3, the preferred filter 10 is shown with a majority of the filter medium 40 removed revealing a rigid, corrugated, filter medium support 32 beneath the filter medium 40. In the preferred embodiment, the corrugated central panel 30 is made of these two parts: the corrugated support 32 (preferably a non-porous polyethylene terephthalate (PET), or other thermoplastic or thermosetting materials) and the attached flexible, fluid-permeable filter medium 40 (preferably a porous polyester batt). The filter medium can alternatively be made of polyethylene, polypropylene, a conventional polymer-cotton mixture or any other filter medium or media combination suitable for attachment to the frame described herein.

A plurality of rectangular apertures 34 are formed in the corrugated support 32, because the filtered fluid, preferably air, must flow through the support 32 in order to be filtered by the filter medium 40. The apertures 34 provide a pathway for the flowing air through the filter 10, permitting filtration of the air as it passes through the attached filter medium 40. The preferred rectangular apertures 34 have an upright beam 36 separating each regularly spaced aperture 34 located at intervals necessary to support the filter medium 40 under various airflow conditions. The beams 36 have a U-shaped cross-section which provides rigidity to resist bending. The apertures 34 alternatively can be geometric shapes other than rectangles, they can be arranged randomly or in regular, spaced intervals, and they can be formed in the tops of ridges and bottoms of channels.

Figure 10:
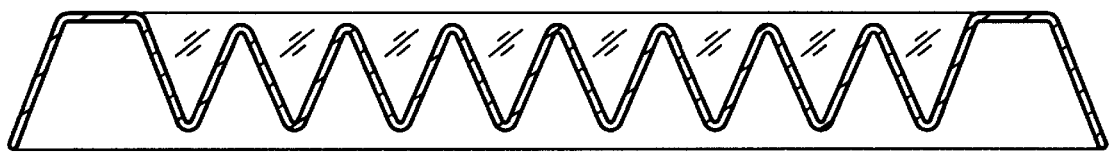
FIG. 10 is a side view in section illustrating an alternative frame.

In the preferred embodiment, each of the frame members 24 and 26 has longitudinal ribs or other rigidity increasing structures to enhance the rigidity of the frame members 24 and 26 against bending lengthwise. Alternatively, the frame members 24 and 26 can be merely the last two pleated panels at opposite ends of the corrugated central panel 30. In this configuration, the frame members 24 and 26 can have the filtration properties of the rest of the central panel 30 by forming apertures in them and attaching the filter medium 40 to them. In still another alternative, especially if the frame is U-shaped, the frame members are not merely the corrugations of the central panel. An example of this alternative configuration is shown in FIG. 10.

The preferred filter 10 is preferably made by heating a sheet of thermoplastic resin such as PET or polyester to provide substantial flexibility, and vacuum forming it into the corrugated support 32 with attached, integral frame members 24–27. In the vacuum forming process, the beams 36 are given their U-shaped cross-section. In one or more subsequent steps, the rectangular apertures 34 are formed between the beams 36 in the corrugations of the support 32, preferably by die cutting. Alternative methods of forming the apertures 34 are well known, and include water-jet cutting and laser cutting. Once the apertures 34 are cut, the filter medium 40 is attached to an upper, lateral surface of one side of the support, and then it is shaped to conform with the outer surface of the corrugated support 32 by sequentially being conformed to the valley and subsequent peak of the corrugated support 32. This shaping is preferably performed by advancing a press along the length of the filter 10 and progressively forcing the filter medium 40 downwardly into each channel of the corrugations, one channel at a time. Of course, the filter medium can be attached to the corrugated support 32 by any method that causes the filter medium to conform to the shape of the corrugated support 32 described above.

Once the filter medium 40 is conformed to the shape of the corrugated support 32, it is attached at multiple points, preferably by adhesive bonding. Other conventional bonding means, such as heat bonding and sonic welding can be substituted. Of course, sheet metal, expanded metal, welded wire and screen can be stamped into shape and substituted for the corrugated support 32, or the entire nestable filter frame. Nestable filter shapes can also be made by preforming fibers, thermoforming fibers or compression molding fibers. Furthermore, the support 32 can alternatively be formed by an injection molding or a pulp paper method.

Figure 4:
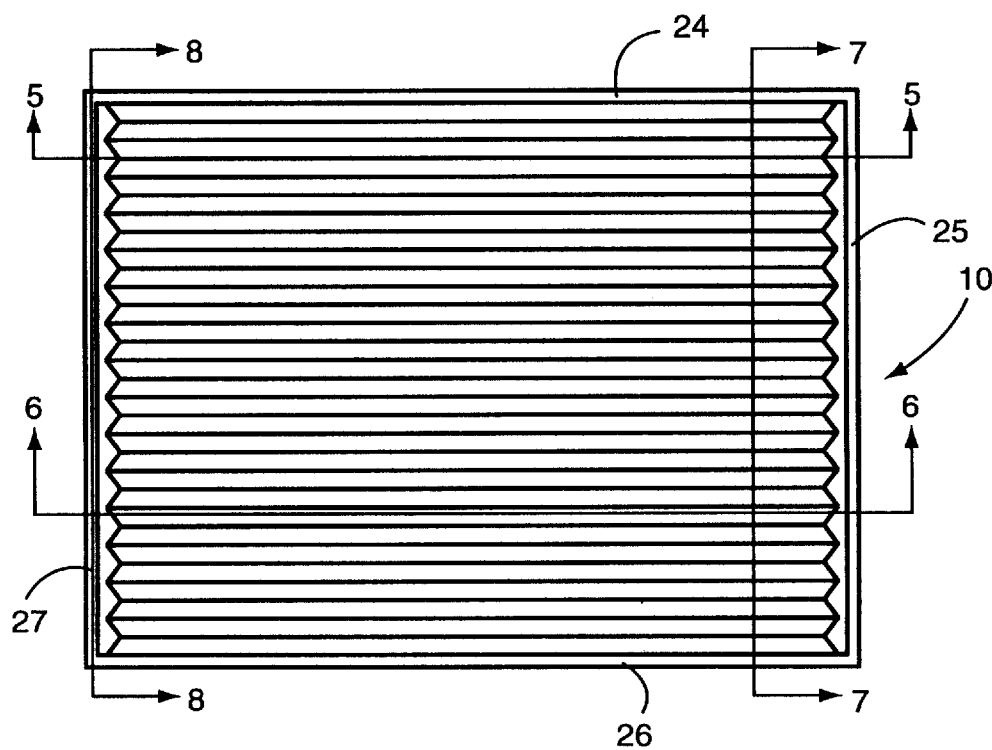
FIG. 4 is a top view illustrating the preferred embodiment.
Figure 5:
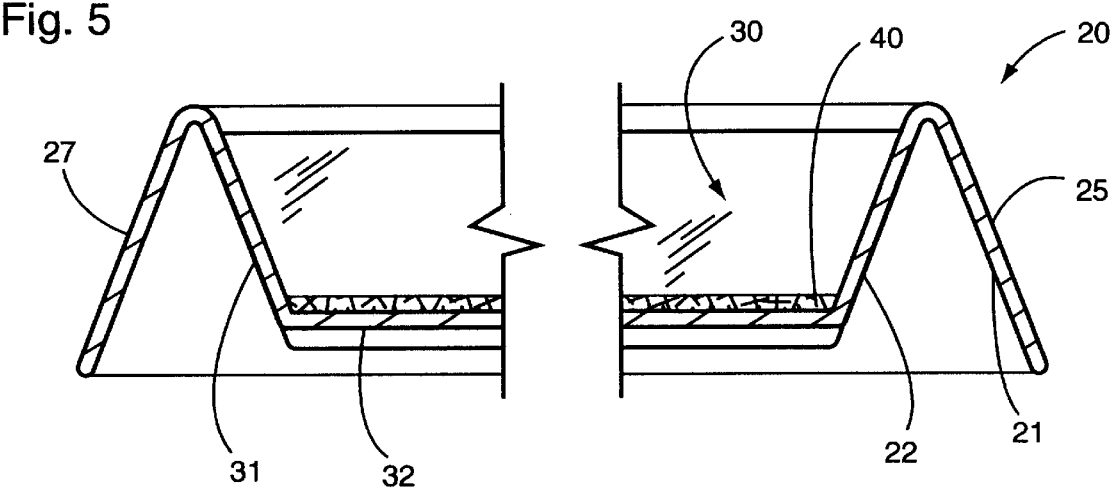
FIG. 5 is a side view in section of the embodiment of FIG. 4.
Figure 6:
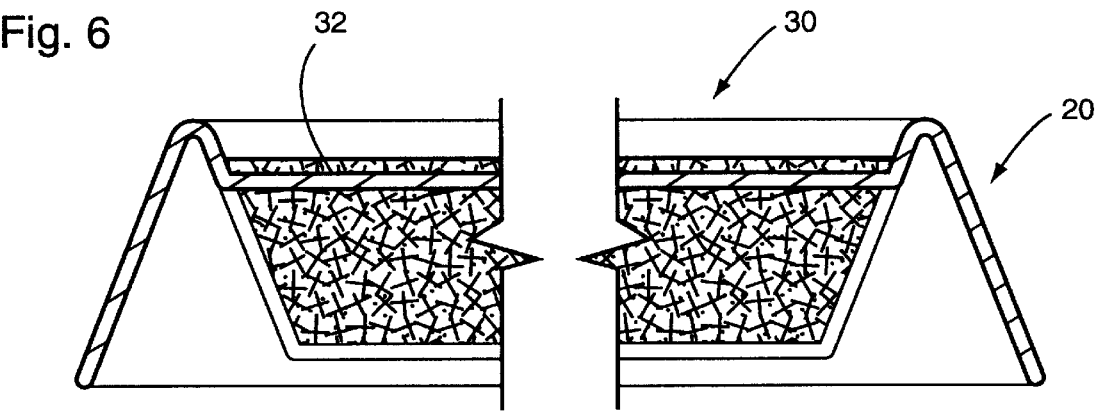
FIG. 6 is a side view in section of the embodiment of FIG. 4.

The view of FIG. 5, which is in section through the line 5—5 of FIG. 4, shows the somewhat complex joint between the frame members 25 and 27 and the corrugated support 32. The lower edges of the inner walls 22 and 31 intersect the outermost edges of the corrugated support 32 at a joint which has a sawtooth, corrugated shape when viewed from the end as in FIG. 2. The corrugated support 32 is preferably integral with the frame 20, and the step in which the complex sawtooth joint is formed is simultaneous with the formation of the corrugations. As the corrugated central panel 30 and the frame 20 are vacuum formed from a sheet, the entire structure assumes its final shape, which includes this sawtooth shaped joint.

FIGS. 5–8 illustrate the small features of the structure of the filter 10 which make it nestable, including the sawtooth joint. The view of FIG. 6, along the line 6—6 through the filter 10 of FIG. 4, is along a section line higher on a corrugation than that of FIG. 5. Because the inner walls 22 and 31 are angled inwardly at the bottom, the length of each panel 35 is greater at the top than the bottom. This difference is visible from FIGS. 5 and 6 and, as explained below, is critical to nestability. FIG. 7, which is a view in section taken along the line 7–7 of FIG. 4, shows the pleated panels 35 making up the central panel 30. The filter medium 40 attaches to the upper surface of the corrugated support 32 and, at opposite ends, to the upper surface of the inner walls 28 and 29.

Figure 11:
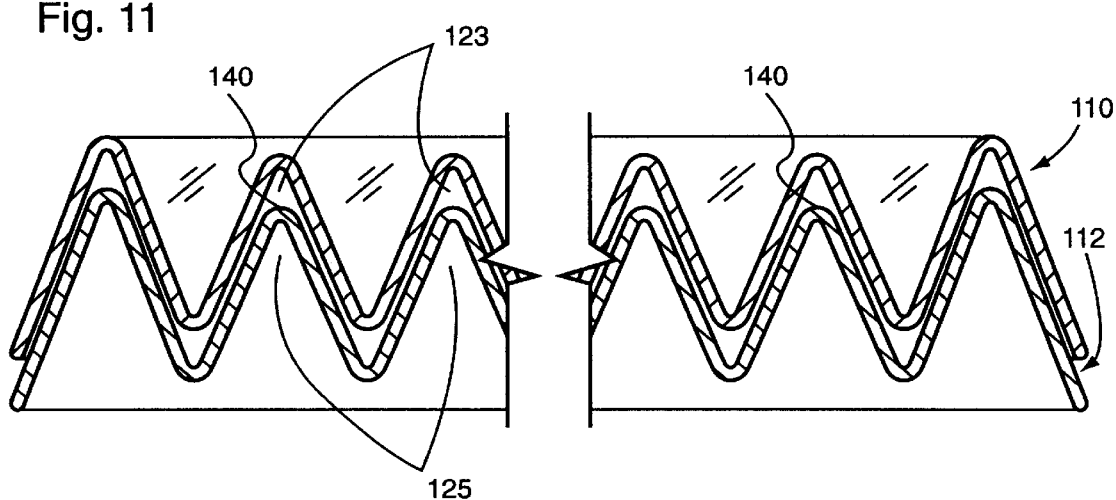
FIG. 11 is a side view in section illustrating two similar, nested filters.

In FIG. 8, which is a view in section through the line 8–8 of FIG. 4, the alignment of the corrugated voids 23 with the channels in the bottom face of the central panel 30 is more easily seen, since the view is through the frame 20 along the channels. The corrugated voids formed on the inner walls of the frame members 25 and 27 permit the ridges of a similarly constructed filter, when that filter is nestably aligned with the filter 10, to protrude beyond the lower edges of the inner walls 22 and 31, despite the greater length of the pleated panels at the top than the bottom. An example of nested filters is shown in FIG. 11. Trying to nest a ridge within a shorter channel would be futile without the corrugated voids. If the corrugated voids 123 and 125 were not formed in the inner walls of the filters 110 and 112 of FIG. 11, the outermost parts of the longer portions of the panels at the tops of the ridges of 140 of the filter 112 would abut against the lower, more inwardly positioned edges of the inner walls of the filter 110. However, the formation of the voids in the invention removes the otherwise blocking parts of the inner walls and effectively extends the ridge-receiving channels on the downwardly directed face of the central panel to the outer walls of the frame.

Figure 9:
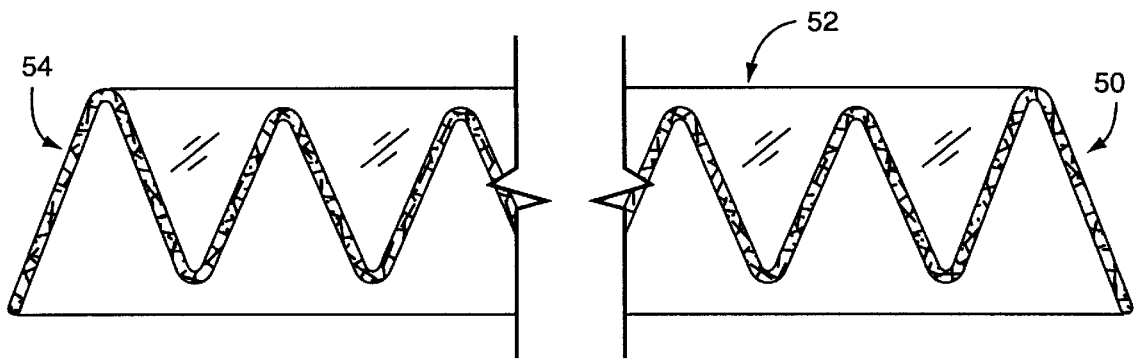
FIG. 9 is a side view in section illustrating an alternative filter.

In addition to the two-piece corrugated central panel of the preferred embodiment, the corrugated central panel and the frame can be formed of a single piece of filter medium which is sufficiently rigid when finished to support itself during use. For example, in the pulp paper method particles can be added to the mixture of pulp, carrier fluid and binder to promote the formation of small pores in the finished filter. This hardened structure can then be used as a filter. Alternatively, glass fibers can be directed onto a mold and hardened into a porous, rigid structure having the shape of the preferred embodiment. These alternatives result in a one-piece filter having rigidity sufficient to support itself and filtration properties needed for a filter. A one-piece filter 50 which is made entirely of filter medium is shown in section in FIG. 9. The corrugated central panel 52 and the frame 54 of the one-piece filter 50 are made of filtration material, and therefore remove particles from the fluid flowing through them.

It is possible to have a frame which is essentially identical to that of the preferred embodiment shown in FIGS. 1–8, but without the outer wall. However, the outer wall provides rigidity to the filter and since the inner wall in the preferred embodiment has portions removed to form the corrugated voids, thus weakening the inner wall, the support provided by the outer wall is preferred.

Another alternative to the preferred embodiment is a filter of similar construction to that shown in FIG. 3, but with an additional element. A second corrugated support is removably fastened to the primary corrugated support on the opposite side of the filter medium. The filter medium, which is removable, is sandwiched between the two corrugated supports, and upon detachment of the second, removably fastened corrugated support, the used filter medium can be removed by hand and replaced with a new, clean filter medium. The second corrugated support is subsequently fastened back to the filter, sandwiching the new filter medium between the two corrugated supports.

The preferred embodiment can be made in a variety of sizes, due to the variability in the dimensions of furnace ducts and other fluid flow pathways. An example of the possible dimensions of a filter is a rectangular filter having an overall length of 24½ inches and an overall width of 15½ inches. The elongated panels 35 which form the corrugations can be aligned along the length or width of the filter. The corrugations for a filter of this size are approximately 1.2 inches from peak to peak, which results in 10 corrugations per foot of the central panel 30. The width from the lowest extremity of one wall to the lowest extremity of the facing wall of the frame is 1.157±0.050 inches. The rigid, corrugated support is approximately 1 11/16 inches in overall height and 0.030 inches thick. The overall height of each pleat, including the filter medium, is 1¾ inches and the angle between pleats is 32 degrees. The filter medium is about ⅛ inch thick, and compresses to approximately 1/16 of an inch at the peaks.

Due to the thickness and density of filter medium used in the preferred embodiment, the peaks and channels are preferably rounded to a radius of approximately ¼ inch to prevent "blinding". Blinding occurs when air cannot flow through a folded portion of the filter material due to too sharp of an angle. Blinding stops, or restricts, air from flowing through a portion of the filter causing that portion to lose its dust-holding capacity. For a thicker filter medium, a radius greater than ¼ inch is necessary, and for a thinner filter medium, a smaller radius is sufficient to avoid blinding.

Another alternative embodiment of the invention includes a multistage filter in which two or more filters of the preferred configuration, but slightly thinner overall, are nestably fastened together. The combined thickness of the filter layers is the thickness needed for the particular application, which in the preferred embodiment is 1¾ inches. Each of the nested filter layers in a multistage filter can have a filter medium of different pore size ranging from coarse to fine, or the pore sizes of all of the filter layers can be identical within a multistage filter. Any number of filters can be stacked and fastened together, but three filters is the number contemplated. Apertures formed through the rigid corrugated supports of the filter layers can be aligned or offset. Only one of the stacked filters needs to have the supporting frame members of the preferred embodiment because it can support the other layers. However, it is preferred that each filter layer have the preferred frame member structure.

As the pores of one of the filter layers of the multistage filter become blocked with particles, the layer can be removed and replaced with one of preferably similar pore size. The replaced layer will ordinarily be the upstream layer, since the flowing air and carried particles strike it first. If all filter layers within the multistage filter are of the same pore size and the upstream layer's pores are blocked first, the upstream layer is removed and the new filter layer is preferably placed on the downstream side. This is preferred because the middle filter will have some blockage, and it is good to leave it at the upstream position that will be most likely to clog first. If the filter layers are of different pore size, the new filter layer is preferably placed in the position of its clogged predecessor.

A multistage filter combined with multiple pore size filter media provides the advantage of filtering out particles of various sizes. Large particles are removed with an upstream coarse filter medium, and finer particles are removed with downstream positioned finer filter media. Therefore, particles of various sizes are effectively filtered without clogging the fine filter medium with large particles.

Figure 12:
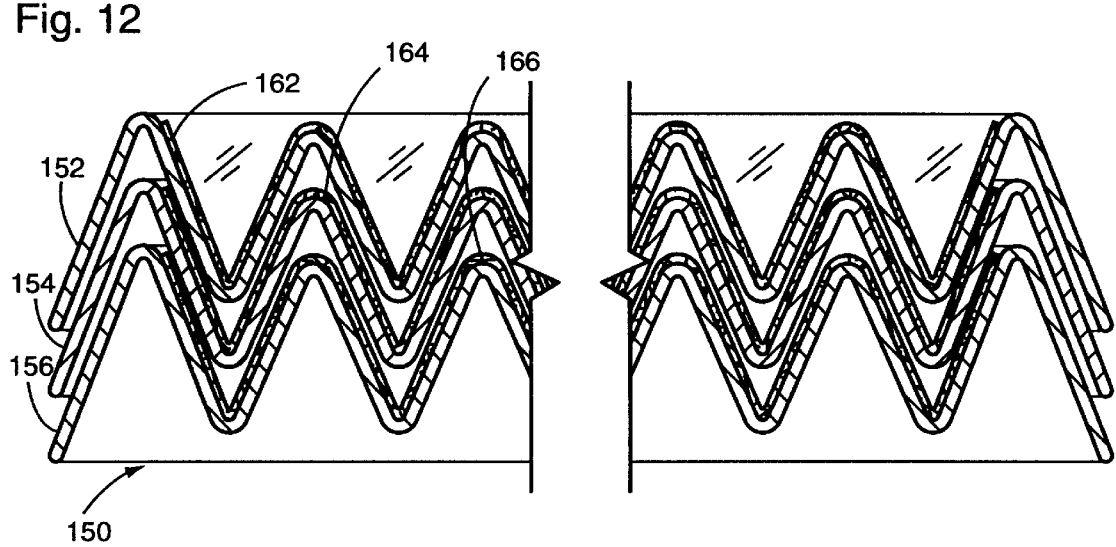
FIG. 12 is a side view in section illustrating an alternative embodiment.

The pressure drop over the multistage filter is less than or equal to the maximum allowed, and this is accomplished by making each filter medium thinner than the filter medium of a similar single-stage filter. An example of a multistage filter 150 is shown in FIG. 12. The filter 150 is made up of the rigid, corrugated supports 152, 154 and 156 and attached filter media 162, 164 and 166, respectively.

While certain preferred embodiments of the present invention have been disclosed in detail, it is to be understood that various modifications may be adopted without departing from the spirit of the invention or scope of the following claims.

I claim:

1. A filter comprising:
   (a) a corrugated central panel having: elongated corrugations arranged in a plane and extending longitudinally from a first peripheral edge of the central panel to a second, opposite peripheral edge of the central panel, said central panel having a first face and an oppositely directed second face; and
   (b) at least two frame members, each frame member mounted to one of the peripheral edges of the central panel and comprising an elongated wall extending at an obtuse angle from the plane of the central panel to permit nesting, and said elongated wall of each frame member having corrugated voids at intersections of the elongated wall with the elongated corrugation, the voids extending in from a longitudinally extending edge of the elongated wall to permit nesting receipt of the corrugations of a similarly constructed filter.

2. A filter in accordance with claim 1, wherein the central panel is made of a filtration material.

3. A filter in accordance with claim 2, wherein the frame members are made of a filtration material.

4. A filter in accordance with claim 1, wherein the central panel further comprises a corrugated central panel support having a plurality of apertures formed therein and a filter medium mounted to a first support face, and wherein the support and the frame members form a unitary, rigid backing for the filter medium.

5. A filter in accordance with claim 1, wherein the frame members further comprise a second elongated wall extending outwardly from the first wall, and forming a channel between the first and second walls.

6. A filter in accordance with claim 5, further comprising third and fourth frame members attached to third and fourth peripheral edges of the central panel.

7. A filter in accordance with claim 1, wherein the corrugations comprise a plurality of pleated plates joined together at folds formed along longitudinal plate edges.

8. A filter in accordance with claim 1, wherein the central panel is made of plastic.

9. A filter in accordance with claim 1, wherein the central panel is made of metal.

10. A filter in accordance with claim 1, wherein the central panel is made of paperboard.

11. A filter in accordance with claim 1, wherein the corrugated central panel and the frame members are made of glass fibers.

12. A filter comprising:
    (a) first and second corrugated central panels, each central panel having elongated corrugations arranged in a plane and extending longitudinally from a first peripheral panel edge to a second peripheral panel edge, each of said central panels having a first face and an oppositely directed second face, wherein the central panels are attached together with one of the faces of the first central panel seating against one of the faces of the second central panel; and
    (b) at least two frame members, each frame member mounted to a peripheral edge of one of the central panels and comprising an elongated wall extending at an obtuse angle from the plane of the central panel to which the frame member is mounted to permit nesting, and each frame member having corrugated voids extending in from a longitudinally extending edge of the elongated wall to permit nesting receipt of the corrugations of a similarly constructed filter.

13. A filter in accordance with claim 12, wherein each corrugated central panel has first and second substantially similar frame members mounted to opposite peripheral edge of said corrugated central panel.

14. A filter in accordance with claim 13, wherein each central panel further comprises a corrugated central panel support having a plurality of apertures formed therein and a filter medium mounted to a first support face, and wherein each support and attached frame member forms a unitary, rigid backing for the filter medium.

15. A filter in accordance with claim 14, further comprising a third substantially similar corrugated central panel fastened to at least one of the first and second panels.

16. A filter in accordance with claim 13, wherein each central panel and each frame member is made of a filtration material.

* * * * *